United States Patent [19]

Lentz

[11] Patent Number: 5,063,813
[45] Date of Patent: Nov. 12, 1991

[54] HYDRAULIC CONTROL SYSTEM FOR VEHICULAR AUTOMATIC TRANSMISSION

[75] Inventor: Carl A. Lentz, Mooresville, Ind.

[73] Assignee: General Motors Corporation, Detroit, Mich.

[21] Appl. No.: 382,456

[22] Filed: Jul. 20, 1989

[51] Int. Cl.[5] ............................................. B60K 41/18
[52] U.S. Cl. ................................................... 74/866
[58] Field of Search ........................... 74/866, 867, 869

[56] References Cited

U.S. PATENT DOCUMENTS

| | | | |
|---|---|---|---|
| 3,688,607 | 9/1972 | Marlow | 74/866 |
| 4,603,603 | 8/1986 | Salmon | 74/868 |
| 4,653,352 | 3/1987 | Nakao et al. | 74/866 |
| 4,793,216 | 12/1988 | Hiramatsu et al. | 74/866 |
| 4,838,126 | 6/1989 | Wilfinger et al. | 74/866 |
| 4,855,913 | 8/1989 | Brekkestran et al. | 74/866 |

*Primary Examiner*—Dirk Wright
*Attorney, Agent, or Firm*—Mark A. Navarre

[57] ABSTRACT

The present invention provides a hydraulic control system for the automatic transmission of a vehicle. The control system utilizes only one pulse width modulating valve to provide modulated pressure to whichever of the torque transfer devices—in the nature of clutches and brakes—constitutes the single, on-coming torque transfer device required to effect the drive ratio selected in accordance with electrical control signals from an on-board, pre-programmed computer. The control system accomplishes its objective by cascading a plurality of relay valves which are coupled to preferably latching, solenoid valves (A through E) which are also controlled by computer. A control valve is interposed between the single, pulse width modulating valve and the plurality of cascaded relay valves to provide both modulated pressure ($P_3$) and main line pressure ($P_1$) to the various torque transfer devices of the transmission. The computer controls the solenoid valves (A through E) to determine which of the torque transmitting devices shall receive line pressure ($P_1$) and which shall receive modulated pressure ($P_3$). In this regard it is noted that the on-going torque transfer device is always actuated by modulated pressure ($P_3$). Moreover, the control system is adapted for operation with vehicular transmissions that provide one more forward drive ratio than the number of torque transfer devices in the transmission.

3 Claims, 4 Drawing Sheets

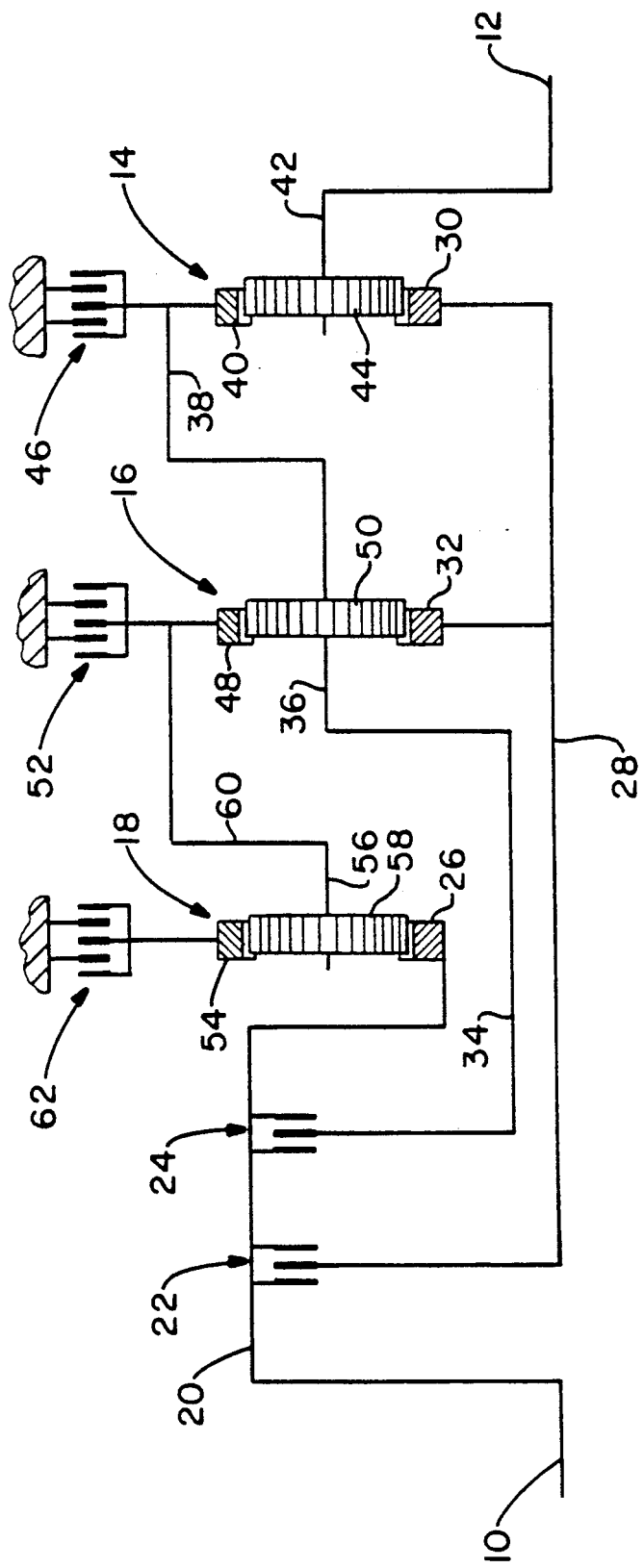
FIG.—1  Prior Art

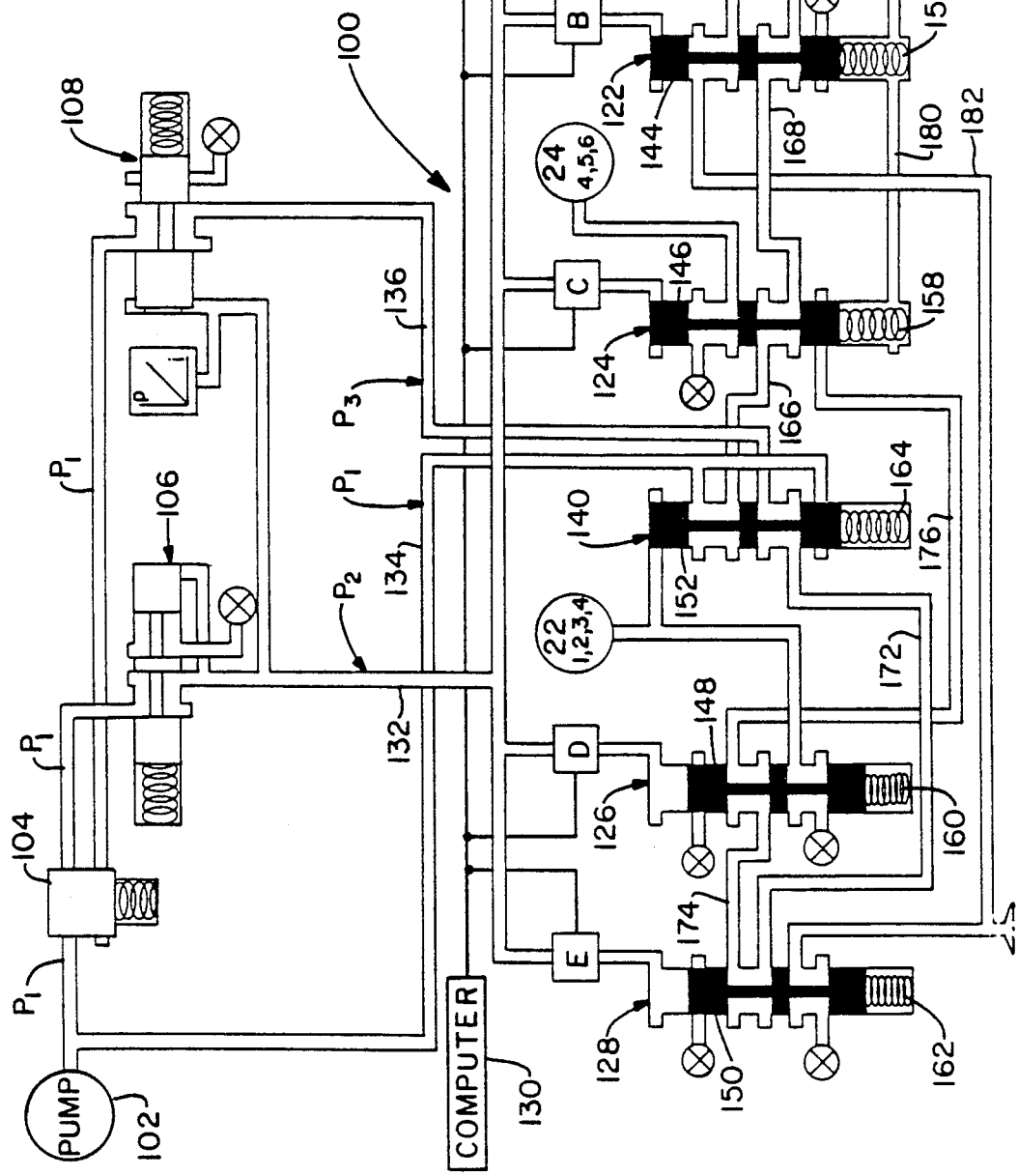

HYDRAULIC CONTROL SYSTEM FOR VEHICULAR AUTOMATIC TRANSMISSION

TECHNICAL FIELD

The present invention relates generally to automatic transmissions for vehicles. More particularly, the present invention relates to hydraulic control systems for selectively actuating a plurality of torque transfer devices in the nature of brakes and clutches by which to operate an automatic transmission for vehicles. Specifically, the present invention provides a hydraulic control system which utilizes a single pulse width pressure modulating valve to effect engagement and disengagement of the plurality of torque transfer devices utilized in a vehicular transmission in order to eliminate harsh engagement of the torque transfer devices when changing gear ratios.

BACKGROUND OF THE INVENTION

Motor vehicle transmissions generally include selectively engageable gear elements for providing multiple forward speed ratios through which the output torque of the engine is applied to the drive wheels of the vehicle. In automatic transmissions, the gear elements which provide the various speed ratios are selectively activated, as through fluid operated, friction torque transfer devices such as clutches and brakes. Thus, shifting from one speed ratio to another generally involves releasing (disengaging) the torque transfer device(s) associated with the current speed ratio and applying (engaging) the torque transfer device(s) associated with the desired speed ratio. Any torque transfer device to be released during a particular shift sequence is conventionally referred to as the off-going torque transfer device while the torque transfer device to be applied during that same shift sequence is referred to as the on-coming torque transfer device. There is generally a slight overlap between the "release" and "apply" of the torque transfer devices involved in a shift sequence, and high quality shifts are achieved only when the "release" and "apply" operations are properly timed and executed.

Conventionally, the shifting control effected by an automatic transmission is performed in conjunction with a logic control map and various inputs which reflect such system parameters as vehicle speed, engine throttle position and engine torque. Fluid pressure signals representative of the various system parameters are processed in an on-board computer and/or microprocessor to determine when a shift is in order and to actuate, in accordance with the logic control map, electronically controlled valves in the hydraulic control system which respond to the signals received from the computer to effect the required engagement and/or disengagement (and in the proper order) of the appropriate torque transfer devices necessary to secure the desired speed ratio changes to the output shaft of the transmission.

Conventionally, a pulse width pressure modulating valve may be employed in conjunction with each torque transfer device required to select the various speed ratios provided by an automatic transmission in order to eliminate the various problems associated with the overlap between the engagement and disengagement of the appropriate torque transfer devices. An exemplary installation of such an arrangement is disclosed in U.S. Pat. No. 4,790,513 issued to Davis et al. Dec. 13, 1988, and assigned to the assignee of the present invention. Installations in which a single pulse width modulating value is employed in conjunction with plural torque transfer devices are also known; see for example, U.S. Pat. No. 4,603,603 issued to Salmon Aug. 5, 1985, and assigned to the assignee of the present invention.

SUMMARY OF THE INVENTION

It is, therefore, a primary object of the present invention to provide an improved system for controlling automatic transmissions.

It is another object of the present invention to provide an improved hydraulic control system, as above, which utilizes only a single pulse width pressure modulating valve to effect engagement and disengagement of the multiple torque transfer devices required to select the several speed ratios provided by even relatively complex, automatic transmissions.

It is a further object of the present invention to provide an improved hydraulic control system for an automatic transmission, as above, that is adapted effectively to eliminate multiple range downshifts when a failure in the system occurs but rather locks in range to prevent sudden vehicle deceleration due to a multiple range downshift heretofore experienced when such system failures occur.

It is still another object of the present invention to provide an improved hydraulic control system, as above, for use in conjunction with a transmission that is capable of providing one additional forward drive speed ratio over and above the actual number of friction drive devices in the transmission.

These and other objects of the invention, as well as the advantages thereof over existing and prior art forms, which will be apparent in view of the following detailed specification, are accomplished by means hereinafter described and claimed.

In general, a hydraulic control system embodying the concepts of the present invention utilizes a plurality of hydraulically operated relay valves interconnected in a cascaded arrangement to effect the operational status of the various torque transfer devices utilized in the transmission. The relay valves are controlled by a plurality of preferably latching, solenoid valves which are, in turn, controlled electrically by signals from a pre-programmed, on-board computer. Specifically, regulated pressure is fed through the computer selected solenoid valve(s) to operate selected relay valves in accordance with control signals from the pre-programmed, on-board computer.

A control relay valve receives main line pressure from the transmission pump as well as modulated fluid pressure from a single, computer controlled, pulse width pressure modulating valve, and these pressures are fed through the cascaded relay valves to the appropriate torque transfer device(s) to achieve the desired drive ratio.

One exemplary embodiment of a hydraulic control system embodying the concepts of the present invention is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 1 is a schematic representation of an automatic vehicular transmission utilizing planetary gear sets actuated by five torque transfer devices to provide six forward speed ratios, as is known to the prior art;

FIG. 2 is a schematic representation of a hydraulic control system in accordance with the present invention as it may be applied to the particular planetary gear sets illustrated schematically in FIG. 1;

FIG. 3 is a logic map for the hydraulic control system represented in FIG. 2, said logic map being presented in tabular form;

DESCRIPTION OF AN EXEMPLARY EMBODIMENT

Figure 4:
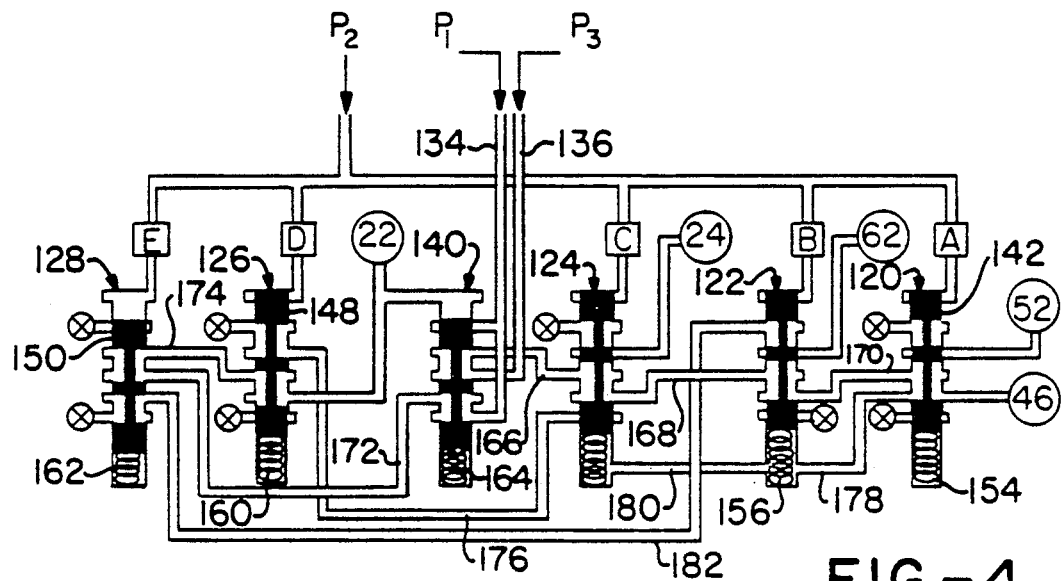
FIG. 4 is a partial schematic representation of the control system illustrated in FIG. 2 showing the various relay valve positions employed to effect a first drive ratio.

A control system embodying the concepts of the present invention is most clearly understood when described in conjunction with a representative automatic transmission for a vehicle. One representative transmission with which a control system embodying the concepts of the present invention can be employed to particular advantage is the "Planetary Gearing Arrangement for a Transmission" disclosed in U.S. Pat. No. 4,070,927, owned by the assignee of the present invention.

Accordingly, FIG. 1 schematically depicts that combination of planetary gear sets disclosed in said U.S. Pat. No. 4,070,927, which serves as the representative prior art transmission with which the present control system may be employed. To facilitate the disclosure of the present invention the prior art transmission may be briefly described as follows.

The prior art transmission schematically represented in FIG. 1 has an input shaft 10, an output shaft 12 and three planetary gear sets 14, 16 and 18 disposed between the input and output shafts 10 and 12, respectively. The input shaft 10 is drivingly connected to a drum 20 which effects the input drive for the two torque transfer devices in the nature of clutches 22 and 24. The drum 20 is also drivingly connected to a sun gear 26 that is a component of the third planetary gear set 18. The input shaft 10 is preferably driven by a torque converter, not shown, that is, in turn, driven by an engine, also not shown, in a well known manner.

The first clutch 22 is selectively connected to a shaft 28, and the shaft 28 is connected to sun gears 30 and 32 which are components of the first and second planetary gear sets 14 and 16, respectively. The second clutch 24 is selectively connected to a shaft 34 which is, in turn, connected to a carrier 36 that is a component of the second planetary gear set 16. The carrier 36 is also connected, through hub 38, to a ring gear 40 in the first planetary gear set 14.

The first planetary gear set 14 also includes a carrier 42 on which a plurality of pinion gears 44 are rotatably mounted. To reduce the complexity of the drawings, only one of the pinion gears 44 is shown, and that pinion gear 44 is represented as meshing with both the sun gear 30 and the ring gear 40. The ring gear 40 is operatively connected to a torque transfer device in the nature of a first friction brake 46 which may be selectively engaged simultaneously to restrain rotation of both the ring gear 40 and the carrier 36. The carrier 42 is operatively connected to the output shaft 12.

The second planetary gear set 16 also includes a ring gear 48 and a plurality of pinon gears 50. The pinion gears 50 are rotatably mounted on carrier 36 to mesh with both the sun gear 32 and the ring gear 48. The ring gear 48 is operatively connected to a torque transfer device in the nature of a second friction brake 52 which may be selectively engaged to restrain rotation of both the ring gear 48 and a hub 60 that is also operatively connected to the third planetary gear set 18.

The planetary gear set 18 similarly includes a ring gear 54, a carrier 56 and a plurality of pinion gears 58 which are rotatably mounted on carrier 56 to mesh with both a sun gear 26 and the ring gear 54. The carrier 56 is drivingly connected to the hub 60. The ring gear 54 is operatively connected to a torque transfer device in the nature of a third friction brake 62 which may be selectively engaged to restrain rotation of ring gear 54.

The clutches 22 and 24 and the brakes 46, 52 and 62 are preferably of the multiple disk, fluid actuated types that are commonly used in vehicular transmissions which incorporate planetary gear sets. The construction, operation and control of the friction torque transfer devices are well known to those familiar with vehicular transmissions such that a detailed description of the friction torque transfer devices is not considered necessary herein.

The planetary gear sets utilized in the type of vehicular transmission represented in FIG. 1 can be controlled by the various clutches and brakes to provide six forward drive ratios and one reverse drive ratio. The terms "forward" and "reverse," of course, refer to vehicle operation and indicate that the output shaft 12 will rotate in the same direction as the input shaft 10 for the six forward drive ratios and in the opposite direction for the reverse ratio. The first, and lowest, speed ratio is established by the engagement of clutch 22 and brake 46. Engagement of brake 46 establishes ring gear 40 as a reaction member in planetary set 14 and engagement of the clutch 22 causes the sun gear 30 to serve as the input member of planetary gear set 14. The output of the planetary set 14 during this drive configuration of the transmission is carrier 42, which is driven in the same direction as input shaft 10 but at a reduced speed, such that the connection of the carrier 42 to the output shaft 12 establishes the lowest drive ratio for the transmission.

The second forward drive ratio is established by the disengagement of brake 46 and the substantially simultaneous engagement of brake 52. The disengagement of brake 46 releases ring gear 40 of planetary gear set 14 as well as the hub 38. The engagement of brake 52 restrains rotation of the ring gear 48 in planetary gear set 16, and thereby establishes ring gear 48 as a reaction member. Because the sun gear 32 is driven forwardly by the input shaft 10, through the engaged clutch 22, the carrier 36 as well as the hub 38, and therefore ring gear 40, will be driven forwardly by the input shaft 10, but at a reduced speed in comparison with the speed of the input shaft 10. Thus, ring gear 40 becomes an input member for planetary set 14. Because the sun gear 30 and the ring gear 40 are both driven forwardly, they will serve to drive the carrier 42 forwardly at a more rapid speed that was available for a given input speed in the first gear ratio.

The third forward drive speed ratio is established by disengagement of brake 52 and substantially simultaneous engagement of brake 62. Disengagement of brake 52 releases ring gear 48, and engagement of the brake 62 restrains rotation of the ring gear 54 in planetary gear set 18, and thereby establishes ring gear 54 as a reaction member. Because the sun gear 26 is driven, by hub 20, in a forward direction and because the ring gear 54 has become a reaction member, the carrier 56, and therefore ring gear 48, will be driven forwardly at a reduced speed ratio. Thus, both sun gear 32 and ring gear 48 are input members, and that serves to drive the carrier 36 forwardly, but at a more rapid speed than was available in the second speed ratio. This increase in the speed of carrier 36 is also operative on ring gear 40 such that carrier 42, and therefore output shaft 12, are rotated at a higher speed that was available for a given input speed, in the second gear ratio.

To establish the fourth forward speed ratio the brake 62 is disengaged while the clutch 24 is substantially simultaneously engaged. With both clutches 22 and 24 engaged the planetary gear sets 14 and 16 are, in effect, conjoined such that the carrier 42 will rotate at a speed equal to the speed of the input shaft 10.

To establish the fifth forward drive ratio the clutch 22 is disengaged while the brake 62 is substantially simultaneously engaged. Disengagement of clutch 22 serves to free the sun gears 30 and 32 from the input shaft 10, and engagement of the brake 62 establishes ring gear 54 as a reaction member. The carrier 56 of planetary gear set 18 is thereby caused to be driven forwardly, but at a reduced speed, which rotates the ring gear 48 of the planetary gear set 16 forwardly, also at a reduced speed. The carrier 36 of planetary gear set 16 is driven forwardly at the same speed as the input shaft 10, as is the ring gear 40 of planetary gear set 14, so that the combined effect is to over-drive the sun gears 32 and 30 in a forward direction, resulting in an overdrive ratio being attained for carrier 42, and therefore also the output shaft 12.

The sixth forward drive ratio is established by disengagement of brake 62 and substantially simultaneous engagement of brake 52. This establishes ring gear 48 as a reaction member in planetary gear set 16 such that sun gears 32 and 30 are over-driven at a more rapid speed than was attained in the fifth speed ratio for a given input speed. This, of course, results in a higher overdrive for carrier 42, and therefore also a higher overdrive speed ratio for the output shaft 12.

To establish a reverse drive ratio, brake 62 and brake 46 are engaged while the remaining clutches and brakes are disengaged. With the brake 62 engaged, the ring gear 54 is a reaction member such that when the sun gear 26 is driven forwardly by the input shaft 10, the carrier 56, and therefore the ring gear 48, will be driven forwardly at a reduced ratio. With the brake 46 is engaged, the carrier 36, and ring gear 40, are both reaction members, and as such the sun gears 30 and 32 will both be driven in a direction opposite to the direction in which the input shaft 10 is being rotated. Hence, because the sun gear 30 is driven oppositely to the input shaft 10, and because the ring gear 40 is a reaction member, the carrier 42 will be driven in a direction opposite to the direction of the input shaft 10, as will the output shaft 12.

It should be apparent from the foregoing description of the forward drive ratios that each ratio requires the engagement of different combinations of two of the five friction torque transfer devices. It should also be apparent from the foregoing description that the transition between successive forward ratios is accomplished by the disengagement of one of the friction torque transfer devices and the substantially simultaneous engagement of another friction torque transfer device. This is termed a single transition shift. Significantly, only five friction torque transfer devices are required to establish six forward speed ratios. Thus, the number of speed ratios in the forward direction is one greater that the number of friction torque transfer devices contained in the transmission.

Referring now to FIG. 2 of the drawings, a hydraulic control system in accordance with the present invention is schematically illustrated and generally designated by reference numeral 100. The control system 100 is provided with a pump 102 which provides main line pressure to various elements of the system 100, including a conventional mainline pressure regulator valve 104 that directs fluid pressure not only to a control regulator valve 106 but also a well known pulse width pressure modulating valve 108. Main line pressure from the pump 102 is indicated by $P_1$, while regulated pressure from regulator valve 106 is indicated by $P_2$ and modulated pressure from the pulse width modulating valve 108 is indicated by $P_3$. The hydraulic control system 100 is also depicted in that configuration required to operate the representative prior art planetary gear set transmission illustrated in FIG. 1 of the drawings. It should be appreciated, however, that the invention may be readily and conveniently applied to other transmission arrangements, and as a result the present invention should not be deemed to be limited to the exact planetary gear set transmissions represented in FIG. 1.

As depicted, the hydraulic control system 100 comprises a plurality of relay valves 120, 122, 124, 126, and 128 which are controlled, in part, by the preferably latching solenoid valves A, B, C, D, and E, respectively. The solenoid valves A–E are, in turn, controlled by signals from an on-board computer 130. The computer 130, in conventional practice, receives various vehicle operational inputs which may be applied to control of the latching solenoids A–E for proper transmission gear ratio selection.

Regulated pressure $P_2$ is directed, via conduit 132, through latching solenoids A–E to operate the positions of the spool members, or pistons, 142, 144, 146, 148 and 150 within the respective relay valves 120, 122, 124, 126 and 128 in accordance with a pre-programmed logic map. Modulated pressure $P_3$ from the pulse width modulating valve 108 is directed, via conduit 136, to a control valve 140, and depending upon the position of the spool member, or piston, 152 within the control valve 140, through various cascaded relay valves 120, 122, 124, 126 and 128 to actuate one or more specific torque transfer devices in accordance with the drive ratio selection determined by the computer 130. In like manner, main line pressure $P_1$ is directed, via conduit 134, to and through the control valve 140 and thereafter through the various relay valves 120, 122, 124, 126 and 128 to maintain one or more specific torque transfer devices in its actuated state, as also determined by the computer 130, in accordance with the drive ratio selected.

As shown in FIG. 2, the torque transfer devices of the automatic transmission to be controlled are indicated by reference numerals 22, 24, 62, 52 and 46, and those identifying numerals correlate directly to the torque transfer devices identified in FIG. 1. The smaller sized reference numerals within the circle representing each torque transfer device indicate the drive ratios which require actuation of that torque transfer device.

The operation of the hydraulic control system 100 will be described with reference to the logic table depicted in FIG. 3. The logic table maps the state of the solenoid valves A–E (identified along the horizontal coordinate of the table) for each drive ratio (identified along the vertical coordinate of the table) provided by the transmission discussed in conjunction with FIG. 1 when operated by the control system 100 depicted in FIG. 2. The integer "0" in the table depicted in FIG. 3 indicates that the designated solenoid valve is in its unactuated state, and the integer "1" indicates that the solenoid valve is in its actuated state.

With reference primarily to FIG. 2, each relay valve 120, 122, 124, 126 and 128 as well as the control valve 140 includes a spool member, or piston, 142, 144, 146, 148, 150 and 152, respectively, that is biased (upwardly as viewed in FIG. 2) by individual compression springs 154, 156, 158, 160, 162 and 164. With continued reference to FIG. 2 relay valves 120, 122, 124, 126 and 128 and the control valve 140 of the control system 100 are depicted with the respective spool members 142, 144, 146, 148, 150 and 152 therein disposed in the position employed to secure the "neutral" mode of the transmission. By reference to the map depicted in FIG. 3 it will be seen that the solenoid valves A, B and C are in their unactuated position, which allows the springs 154, 156 and 158 to bias spool members 142, 144 and 146, respectively, upwardly to the position depicted in FIG. 2. Also according to the map depicted in FIG. 3, solenoid valves D and E have, however, been actuated, which allows hydraulic fluid under regulated pressure $P_2$ from regulator 106 to flow, via conduit 132, through the solenoid valves D and E and into the relay valves 126 and 128. The regulated pressure $P_2$ overcomes the biasing action of the springs 160 and 162 to move the spool members 148 and 150, respectively, to their lowermost position, also as depicted in FIG. 2.

With the solenoid valves A–E, the control valve 140 and the relay valves 120, 122, 124, 126 and 128 so disposed, main line pressure $P_1$ passes from conduit 134 through control valve 140, conduit 166, relay valve 124, conduit 168, relay valve 122, conduit 170 and relay valve 120 to actuate the first friction brake 46 in order to establish the "neutral" mode of the transmission. Simultaneously, modulated pressure $P_3$ passes from conduit 136 through control valve 140, conduit 172, relay valve 128, conduit 174, relay valve 126 and conduit 176 but is blocked by the position of the spool member 146 in relay valve 124. It will be noted that line pressure $P_1$ from relay valve 120 feeds through conduit 178, relay valve 122 and conduit 180 to secure the spool member 144 in relay valve 122 as well as the spool member 146 in relay valve 124 in their uppermost dispo-sition. As will be hereinafter more fully described, the use of hydraulic pressure to supplement the biasing action of the springs 156 and 158 contributes to a safety feature of the invention which assures that the drive ratios will not inadvertently shift beyond neutral should an electrical power failure occur.

To establish a shift to the first drive ratio reference to the map depicted in FIG. 3 reveals that the change from neutral requires deactivation of the solenoid valve D. With solenoid valve D deactivated the spring 160 will move the spool member 148 within relay valve 126 upwardly so that the relay valves 120, 122, 124, 126 and 128 are disposed as depicted in FIG. 4. Initially, however, the spool member 152 in control valve 140 remains in its uppermost disposition, as depicted in FIG. 2. So disposed, modulated pressure $P_3$ from conduit 136 passes through the control valve 140, conduit 172, relay valve 128, conduit 174 and relay valve 126 to actuate the first friction clutch 22.

It should also be observed that the modulated pressure $P_3$ which actuates the first clutch 22 also accesses the control valve 140, so that as the modulated pressure $P_3$ achieves its steady, unmodulated state, the unbalanced pressure on the spool member 152 moves the spool member 152 downwardly against the biasing action of spring 164 to the position depicted in FIG. 4. So positioned, the line pressure $P_1$ from conduit 134 is directed through relay valve 140, conduit 172, relay valve 128, conduit 174 and relay valve 126 to maintain the actuated mode of the first clutch 22.

Simultaneously, the modulated pressure $P_3$ from conduit 136 is now directed through control valve 140, conduit 166, relay valve 124, conduit 168, relay valve 122, conduit 170 and relay valve 120 to maintain actuation of the first friction brake 46 which remains engaged in both the neutral and the first drive ratio.

Figure 5:
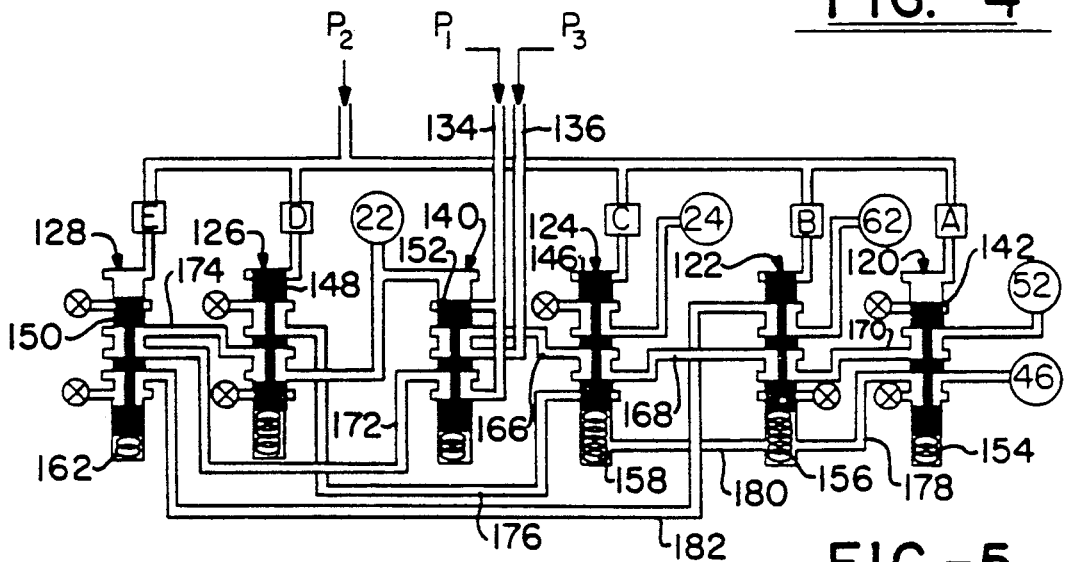
FIG. 5 is a partial schematic representation similar to that shown in FIG. 4 showing the various relay valve positions employed to effect a second drive ratio.

To establish a shift to the second drive ratio the logic map indicates that the change from the first drive ratio is effected by actuation of the solenoid valve A. This actuation of the solenoid valve A permits regulated pressure $P_2$ from conduit 132 to pass through the solenoid valve A and overcome the biasing pressure of spring 154 to move the spool member 142 in relay valve 120 downwardly as viewed in FIG. 4 to the position depicted in FIG. 5. The downward displacement of spool member 142 permits the modulated pressure $P_3$ which actuates the first brake 46, as well as the hydraulic modulated pressure $P_3$ which secures the spool members 144 and 146 in their uppermost disposition within relay valves 122 and 124, respectively, to vent through relay valve 120 to exhaust X. Substantially simultaneously therewith the displacement of the spool member 142 in relay valve 120 directs the modulated pressure $P_3$ from conduit 136 through relay valve 140, conduit 166, relay valve 124, conduit 168, relay valve 122, conduit 170 and relay valve 120 to actuate the second friction brake 52, as required. This arrangement is illustrated in FIG. 5.

Figure 6:
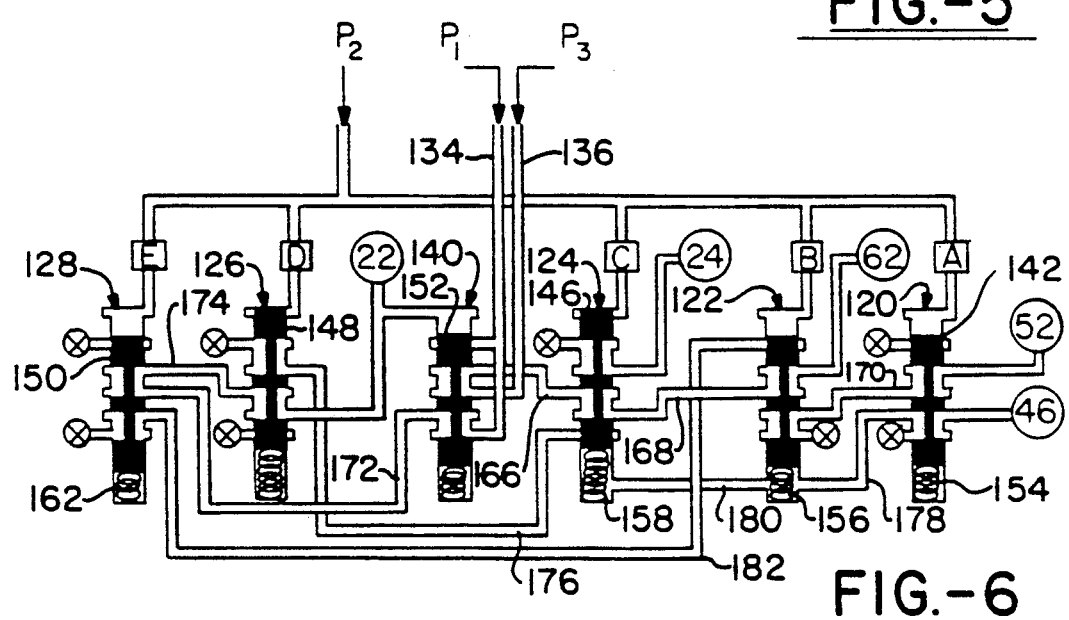
FIG. 6 is a partial schematic representation similar to that shown in FIG. 4 showing the various relay valve positions employed to effect a third drive ratio.

To establish a shift to the third drive ratio the logic map indicates that the change from the second drive ratio is effected by actuation of solenoid valve B. Actuation of solenoid valve B permits regulated pressure $P_2$ from conduit 132 to pass through the solenoid valve B and overcome the biasing pressure of spring 156 to move spool member 144 in relay valve 122 downwardly as viewed in FIG. 5 to the position depicted in FIG. 6. The downward displacement of spool member 144 allows the pressure of the hydraulic actuating fluid in the second friction brake 52 to pass through relay valve 120, conduit 170 and relay valve 122 to vent through exhaust X. This same movement of the spool member 144 in relay valve 122 directs the modulated pressure $P_3$ from conduit 136 to pass through control valve 140, conduit 166, relay valve 124, conduit 168 and relay valve 122 substantially simultaneously to actuate the third friction brake 62. Line pressure $P_1$ continues to maintain engagement of the first friction clutch 22 which remains engaged during the transition from the first to the third drive ratio. This disposition of the control system 100 is illustrated in FIG. 6.

Figure 7:
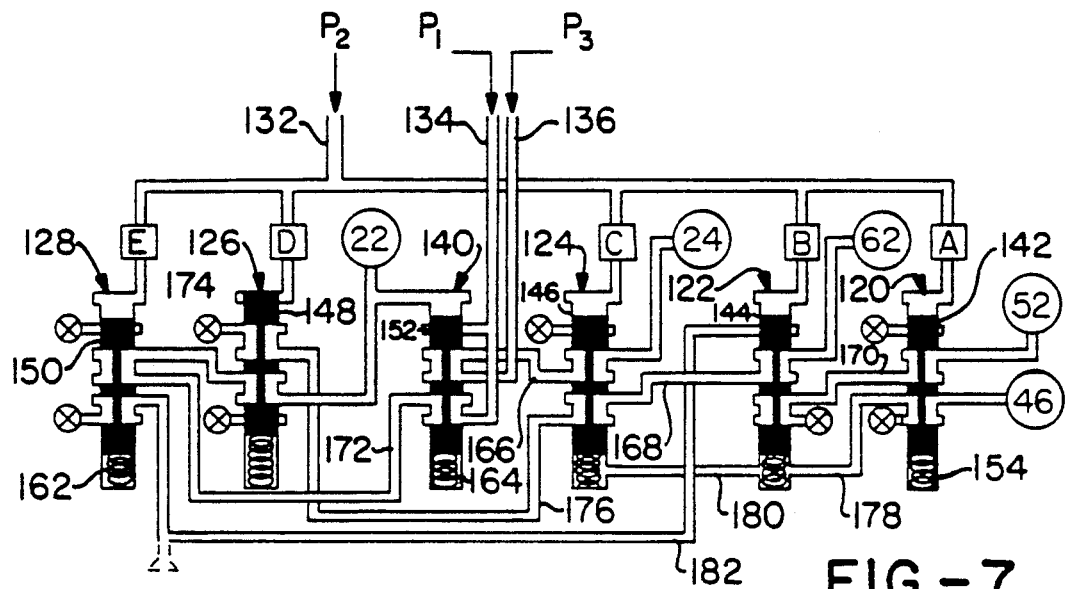
FIG. 7 is a partial schematic representation similar to that shown in FIG. 4 showing the various relay valve positions employed to effect a fourth drive ratio.

To establish a shift to the fourth drive ratio the logic map indicates that the change from the third drive ratio is effected by actuation of solenoid valve C. Actuation of solenoid C permits the regulated pressure $P_2$ from conduit 132 to pass through solenoid valve C and overcome the biasing pressure of spring 158 to move the spool member 146 in relay valve 124 downwardly as viewed on FIG. 6 to the position depicted in FIG. 7. The downward displacement of spool member 146 allows the pressure in the third brake 62 to pass through relay valve 122, through conduit 168, relay valve 124, conduit 176, and valve 126 to vent through exhaust X. This downward displacement of spool member 146 also permits modulated pressure $P_3$ to flow from the control valve 140 through conduit 166 and relay valve 124 substantially simultaneously to actuate the second friction clutch 24. Line pressure $P_1$ continues to maintain engagement the first friction clutch 22, which remains engaged during the transition from the third to the fourth drive ratio. This arrangement is illustrated in FIG. 7.

Figure 8:
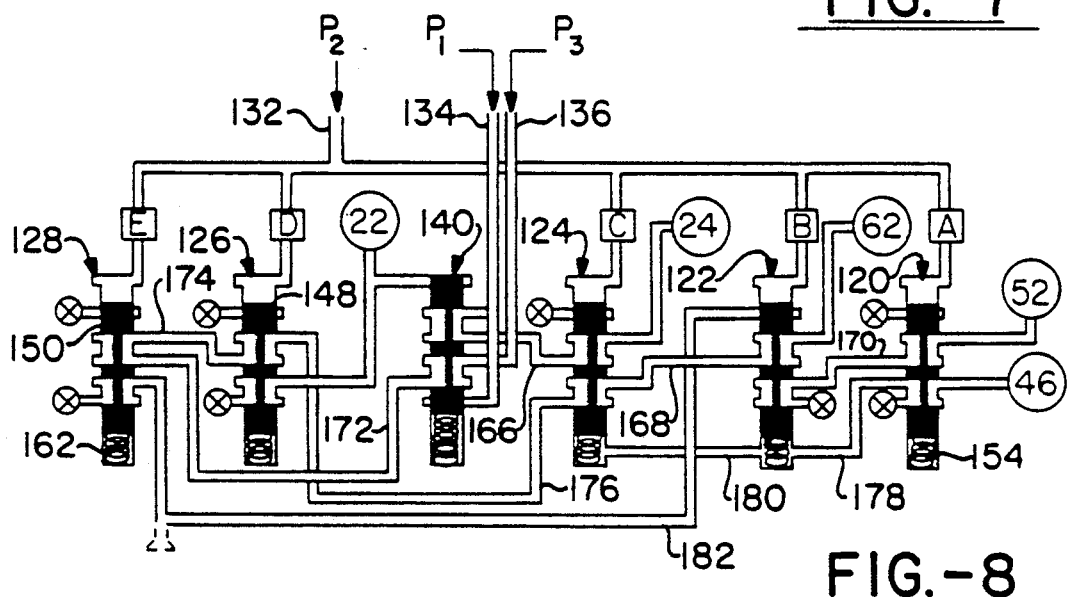
FIG. 8 is a partial schematic representation similar to that shown in FIG. 4 showing the various relay valve positions employed to effect a fifth drive ratio; and, FIG. 9 is a partial schematic representation similar to that shown in FIG. 4 showing the various relay valve positions employed to effect a sixth drive ratio.

To establish a shift to the fifth drive ratio the logic map indicates that solenoid valve D must be actuated. Actuation of solenoid valve D permits regulated pressure $P_2$ from conduit 132 to pass through solenoid valve D and overcome the biasing pressure of spring 160 to move the spool member 148 in relay valve 126 downwardly as viewed in FIG. 7 to the position depicted in FIG. 8. The downward displacement of spool member 148 in relay valve 126 allows the hydraulic pressure which had previously actuated the first friction clutch 22 to pass through relay valve 126 and vent through the exhaust X. Simultaneously, the hydraulic pressure which has maintained the control valve 140 in the downwardly displaced location is also vented through relay valve 126 to exhaust X. This permits the spool member 152 in the control valve 140 to move upwardly from the position depicted in FIG. 7 to the position depicted in FIG. 8. This displacement of the spool member 152 in the control valve 140 permits line pressure $P_1$ in conduit 134 to be directed through the control valve, 140, conduit 166 and relay valve 124 to maintain engagement of the second friction clutch 24 which remains engaged during the transition from the fourth to the fifth drive ratio. That same displacement of the spool member 152 in the control valve 140 directs modulated pressure $P_3$ in conduit 136 through control valve 140, conduit 172, relay valve 128, conduit 174, relay valve 126, conduit 176, relay valve 124, conduit 168 and relay valve 122 substantially simultaneously to actuate the third friction brake 62, as is also required to effect the fifth drive ratio. This configuration is depicted in FIG. 8.

Figure 9:
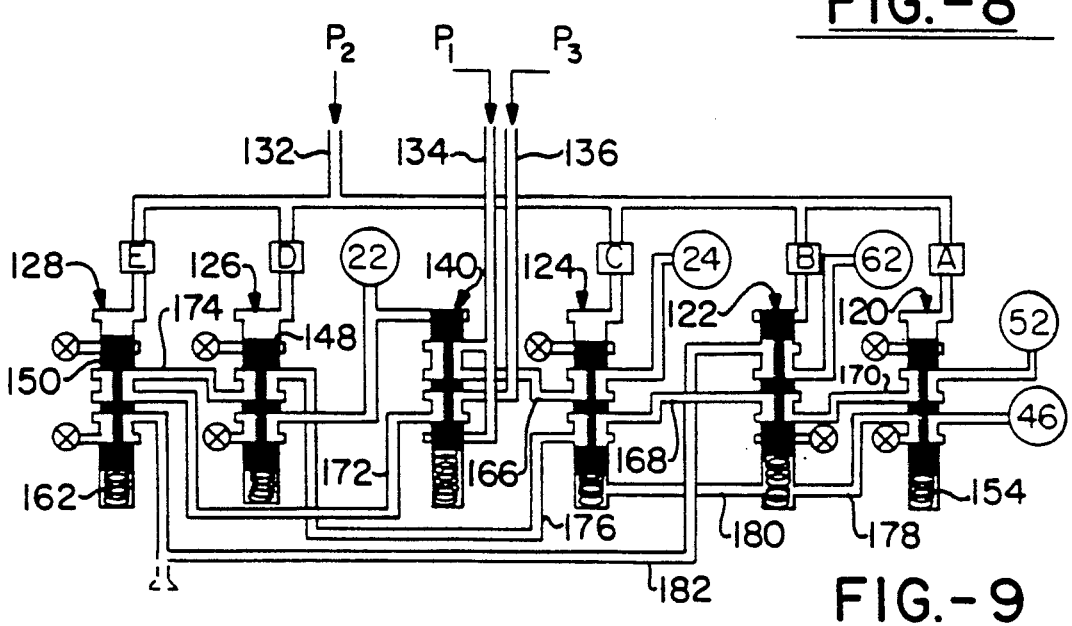

To establish a shift to the sixth drive ratio the logic map indicates that the change from the fifth drive ratio requires deactivation of the solenoid valve B. With solenoid valve B deactivated the spring 156 will move the spool member 144 within relay valve 122 upwardly from the position depicted in FIG. 8 to the position depicted in FIG. 9. The upward displacement of the spool member 144 in relay valve 122 permits the hydraulic pressure which had previously actuated the third friction brake 62 to pass through relay valve 122, conduit 182 and relay valve 128 to vent through exhaust X. This displacement of the spool member 144 does not effect the line pressure $P_1$ from maintaining engagement of the second friction clutch 24, which remains engaged during the transition from the fifth to the sixth drive ratio, but it does direct modulated pressure $P_3$ from conduit 136 through control valve 140, conduit 172, relay valve 128, conduit 174, relay valve 126, conduit 176, relay valve 124, conduit 168, relay valve 122, conduit 170 and relay valve 120 substantially simultaneously to actuate the second friction brake 52, as is also required to effect the sixth drive ratio. This configuration is depicted in FIG. 9.

To effect a shift from neutral to the reverse drive ratio, the logic map indicates that solenoid valve E must be deactivated. With solenoid valve E deactivated the spring 162 will move the spool member 150 within relay valve 128 upwardly from the position depicted in FIG. 2. The upward displacement of the spool member 150 in relay valve 128 does not effect maintaining engagement of the first friction brake 46, which remains engaged during the transition from neutral to the reverse drive ratio, but it does permit modulated pressure $P_3$ from conduit 136 to pass through the control valve 140, conduit 172, relay valve 128, conduit 182 and relay valve 122 to actuate the third friction brake 62, as is also required to effect the reverse drive ratio.

From the foregoing it must be appreciated that a single, pulse width modulating valve 108 provides an output to the control valve 140 which directs the modulated hydraulic pressure through a plurality of cascaded relay valves 120, 122, 124, 126 and/or 128 to actuate the oncoming torque transfer device 22, 24, 46, 52 and/or 62. The control valve 140 also effectively directs the main line pressure $P_1$ through one or more of the cascaded relay valves to secure engagement of certain previously actuated torque transfer devices when modulated pressure must be directed to another torque transfer device. This configuration of a control valve which communicates with a plurality of cascaded relay valves, in combination with the latching solenoids A-E, permits provision of a locking mode should there be an electrical power failure in, or to, the system.

The particular inter-relationship of the control valves and the cascaded relay valves precludes the application of three torque transfer devices at the same time. Therefore, a diagnostic detection and response is not required by the control system to prevent any sudden deceleration of the vehicle or downshifts due to clutch capacities. If, for example, the solenoid valves A-E are each of the normally closed, latching variety, upon an electrical failure the solenoid valves will latch in their position at the time of the electrical failure to effect a lock-in-range mode. On the other hand, selected combinations of normally open and normally closed, latching, solenoid valves may be employed to permit the system to shift to a predetermined drive ratio or to shift to only one drive range below that which the system had selected prior to the electrical failure. As a further example, if latching solenoid valves B, C, and D are of the normally open variety and the latching solenoid valves A and E are of the normally closed variety, an electrical failure would result in a shift to the fifth drive ratio were the electrical failure to occur when the transmission is in the second, or higher,, drive ratio, but such an electrical failure would effect a shift to neutral if the transmission were in the first drive ratio.

It should also be apparent that in the event of a relay valve malfunction—i.e., a stuck valve—the exemplary embodiment could be assured to prevent a shift to another gear ratio from happening. The failure of a relay valve could be detected by a monitor feeding the computer 130, and that result could inhibit shift commands from the computer which might otherwise cause additional problems.

Accordingly, while the invention is shown and described with respect to a particular transmission and clutch shift schedule, the invention should not be considered as being limited to the arrangement shown in the drawings. Obviously, other modifications and variations are possible in view of the above teachings such that the invention is limited only by the scope of the appended claims.

The embodiments of the invention in which an exclusive property or privilege is claimed are defined as follows:

1. A hydraulic control system for the automatic transmission of a vehicle wherein the transmission includes a plurality of torque transfer devices which can be engaged and disengaged in response to fluid pressure provided by a pump, the sequence of engagement and disengagement of the torque transfer devices being determined by a pre-programmed, on-board computer so as to provide a neutral, reverse, and a plurality of forward drive ratios, the control system interconnected between the pump and the torque transfer devices and comprising, in combination:
   a plurality of conduits;
   a plurality of fluid operated relay valves interconnected in a cascaded arrangement by said conduits, particular relay valves having outputs connected to effect the operational status of specific torque transfer devices;
   a plurality of solenoid valves;
   each solenoid valve having an electrical control input, a fluid pressure inlet and a fluid pressure outlet;
   a pressure regulating valve having an inlet and an outlet;
   said pressure regulating valve receiving line pressure from the pump at said regulating valve inlet;
   said regulating valve outlet connected to the fluid pressure inlets of said solenoid valves;
   said electrical input of each solenoid valve connected to receive a control input from the computer and said outlet of each solenoid valve connected to actuate one of said relay valves;
   a single, pulse width, pressure modulating valve receiving line pressure from the pump and providing a modulated output pressure;
   and, a control valve having first and second inlets;
   said first inlet of said control valve receiving modulated pressure from said modulating valve;
   said second inlet of said control valve receiving line pressure from the pump;
   said control valve having an outlet interconnected by said conduits through selected of said cascaded relay valves such that modulated pressure is fed from said control valve to the torque transfer devices in accordance with the computer control signals to said solenoid valves and such that line pressure is selectively fed to particular torque transfer devices in accordance with computer control signals to said solenoid valves.

2. A hydraulic control system for the automatic transmission of a vehicle wherein the transmission includes a plurality of torque transfer devices which can be engaged and disengaged in response to fluid pressure provided by a pump, the sequence of engagement and disengagement of the torque transfer devices being determined by a pre-programmed, on-board computer so as to provide a neutral, reverse, and a plurality of forward drive ratios, the control system interconnected between the pump and the torque transfer devices and comprising, in combination:
   a plurality of fluid operated relay valves interconnected in a cascaded arrangement such as to provide an output from particular ones to the torque transfer devices in order to effect engagement and disengagement thereof;
   a plurality of on/off, latching type, solenoid valves electrically controlled by the computer and having outputs coupled to control the operation of the relay valves;
   a pressure regulating valve connected to receive line pressure from the pump and provide a regulated fluid pressure to each of the plurality of said on/off, latching type solenoid valves;
   a pressure modulating valve connected to receive line pressure from the pump and to provide pulse width modulated output pressure;
   a control valve having a first input connected to receive modulated pressure from said modulating valve and a second input to receive line pressure from the pump, said control valve having various outlets to direct modulated pressure to selected of said cascaded relay valves such as to feed modulated pressure to particular torque transfer devices for engaging those torque transfer devices and having various outputs interconnecting said control valve to other of said cascaded relay valves, as required, to feed line pressure thereto;
   and, said modulated and line pressures being directed through the cascaded relay valves in accordance with signals to the on/off, latching type solenoid valves from the pre-programmed on-board computer.

3. A hydraulic control system for the automatic transmission of a vehicle including a pump to provide fluid line pressure, the transmission having five torque transfer devices responsive to fluid pressure to be engaged and disengaged in a particular sequence and combination as determined by a pre-programmed on-board computer to produce neutral, reverse, and at least six forward drive gear ratios, the control system interconnected between the pump and the five torque transfer devices and comprising, in combination:
   a plurality of fluid-operated relay valves interconnected in a cascade arrangement in order to provide pressure outlets to the torque transfer devices and thereby effect engagement and disengagement of the torque transfer devices;
   a plurality of latching type solenoid valves electrically controlled by the computer, each solenoid valve having an fluid outlet coupled to control the operation of one said cascaded relay valve;
   a pressure regulating valve connected to receive line pressure from the pump and to provide regulated fluid pressure to each of said plurality of latching type solenoid valves;

a single, pulse width, pressure modulating valve connected to receive fluid line pressure from the pump;

a control valve having a first inlet connected to receive modulated pressure from the pressure modulating valve and a second inlet connected to receive line pressure from the pump;

said control valve interconnecting its output to various of said cascaded relay valves such as to feed main line fluid pressure through said relay valves to particular torque transfer devices and to feed modulation fluid pressure through other of said relay valves to particular torque transfer devices;

said control valve having a third inlet accepting input from at least one said relay valve to effect a change in the outlets from said control valve in accordance with the fluid pressure at said third inlet;

said line and modulated fluid pressures being fed through the cascaded relay valves from said control valve in accordance with the electrical signals from the computer to said latching type solenoid valves in order to provide at least six forward drive ratios from the five torque transfer devices of the transmission.

* * * * *